United States Patent
Kalagananam et al.

(10) Patent No.: US 9,104,437 B2
(45) Date of Patent: *Aug. 11, 2015

(54) EFFICIENT SERIALIZATION OF MUTABLE OBJECTS

(75) Inventors: Aruna A. Kalagananam, Bangalore (IN); Prashanth K. Nageshappa, Bangalore (IN); Sathiskumar Palaniappan, Namakkal (IN)

(73) Assignee: International Business Machines Corporation, Armonk, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/595,508

(22) Filed: Aug. 27, 2012

(65) Prior Publication Data

US 2012/0324480 A1    Dec. 20, 2012

Related U.S. Application Data

(63) Continuation of application No. 12/960,891, filed on Dec. 6, 2010.

(51) Int. Cl.
    *G06F 9/44* (2006.01)
(52) U.S. Cl.
    CPC ................................... *G06F 9/4435* (2013.01)
(58) Field of Classification Search
    None
    See application file for complete search history.

(56) References Cited

U.S. PATENT DOCUMENTS

| | | | |
|---|---|---|---|
| 6,085,198 A | 7/2000 | Skinner et al. | |
| 6,757,708 B1 | 6/2004 | Craig et al. | |
| 7,207,002 B2 | 4/2007 | Mireku | |
| 8,131,860 B1 | 3/2012 | Wong et al. | |
| 2002/0038301 A1 | 3/2002 | Aridor et al. | |
| 2002/0103819 A1* | 8/2002 | Duvillier et al. | 707/206 |
| 2002/0184264 A1 | 12/2002 | Berg et al. | |
| 2003/0204517 A1 | 10/2003 | Skinner et al. | |
| 2005/0071809 A1 | 3/2005 | Pulley | |
| 2005/0108627 A1 | 5/2005 | Mireku | |
| 2006/0122971 A1 | 6/2006 | Berg et al. | |
| 2006/0155742 A1 | 7/2006 | Stanev | |
| 2009/0198899 A1 | 8/2009 | Revanuru | |
| 2010/0115203 A1 | 5/2010 | White | |

FOREIGN PATENT DOCUMENTS

WO    2008054790 A3    5/2008

OTHER PUBLICATIONS

U.S. Appl. No. 12/960,891 entitled "Efficient Serialization of Mutable Objects"; Non-final office action dated Nov. 13, 2012.

(Continued)

*Primary Examiner* — Shih-Wei Kraft
(74) *Attorney, Agent, or Firm* — Russell Ng PLLC; Parashos Kalaitzis

(57) ABSTRACT

A method of serialization in a data processing system includes serializing a mutable object utilizing a full serialization process, caching primitive data and metadata regarding the mutable object in binary format in cache and then checking whether primitive fields of the mutable object are modified. Thereafter, the mutable object is again serialized utilizing an abbreviated serialization process by reference to the cached primitive data and metadata if the primitive fields of the object are not modified. In the event that primitive fields of the object are modified, the full serialization process is utilized. Thereafter, the serialized mutable object is communicated to a distributed code element.

7 Claims, 7 Drawing Sheets

(56) References Cited

OTHER PUBLICATIONS

U.S. Appl. No. 12/960,891 entitled "Efficient Serialization of Mutable Objects"; Final office action dated Mar. 29, 2013.
Veldema et al.; "Compiler Optomized Remote Method Invocation"; Computer Science Dept. 2, Univ. of Erlangen-Nuremberg, Germany, Proceedings of the IEEE Int'l Conference on Cluster Computing I, Sep. 2003 (0-7695-2066).
Park et al.; "Specializing the Java Object Serialization Using Partial Evaluations for a Faster RMI"; Dept. of Computer Science and Engineering, Korea University, Seoul, Korea Aug. 2001 IEEE (0-7695-1153).
Kabutz, H; The Java Specialists' Newsletter, Issue 166 (Nov. 30, 2008); http://javaspecialists.eu/print.do.
Shirah, J; "Getting Started With Enterprise JavaBeans Technology"; developerWorks—IBM Corporation 2003.

* cited by examiner

EFFICIENT SERIALIZATION OF MUTABLE OBJECTS

This application is a continuation of U.S. patent application Ser. No. 12/960,891 entitled "EFFICIENT SERIALIZATION OF MUTABLE OBJECTS" by Aruna A. Kalagananam et al. filed Dec. 6, 2010, the disclosure of which is hereby incorporated herein by reference in its entirety for all purposes.

BACKGROUND OF THE INVENTION

1. Technical Field

The present invention relates in general to data processing, and in particular, to efficient serialization of mutable program objects

2. Description of the Related Art

In a typical enterprise Java® environment, a server services many clients contemporaneously. For example, in a typical online banking environment, numerous customers may each utilize a client application executing on a client device to make transactions within one or more of the customer's accounts with a financial institution. Each transaction entails a remote call to the server to effect a desired action, such as a balance inquiry, electronic bill payment, transfer of funds, or withdrawal, which in turn requires data to be communicated between the client device and server.

Distributed computing in a Java® enterprise edition (Java EE) environment such as the online banking environment discussed above makes use of either Remote Method Invocation—Java® Remote Method Protocol (RMI-JRMP) or Remote Method Invocation—Internet Inter-Orb Protocol (RMI-IIOP), both of which leverage Java® serialization. The term "serialization" is used in the art to describe the process of saving an object's state as a sequence of bytes. In the Java® language, whenever a local process wants to send an object to a remote process running in a remote machine, the local process will serialize the object into a sequence of bytes (i.e., an Intermediate Format) and then send the sequence to the remote process using sockets. The remote process then deserializes the Intermediate Format to create an exact object graph on the remote machine.

In the prior art, serialization is a resource and time consuming process that includes the following principal steps:
1. Traverse and store the object graph, starting with the most derived class until java.lang.Object is reached;
2. Write the class definition for the object graph to the output stream; and
3. Convert the fields in each serializable class to a binary format and write the same to the output stream.

In current implementations, the Java® serialization process implements stream-based caching of the binary data. However, the stream cache is cleared each time the stream is closed or reset because there is presently no way of knowing whether or not mutable objects have changed. Consequently, the serialization process is carried out for an object even if the object is unchanged since it was last communicated between the client and server.

SUMMARY OF THE INVENTION

In some embodiments, a method of serialization in a data processing system includes serializing a mutable object utilizing a full serialization process and caching primitive data and metadata regarding the mutable object in binary format in cache. Thereafter, the mutable object is again serialized utilizing an abbreviated serialization process by reference to the cached primitive data and metadata, and the serialized mutable object is communicated to a distributed code element.

DETAILED DESCRIPTION OF ILLUSTRATIVE EMBODIMENT

Figure 1:
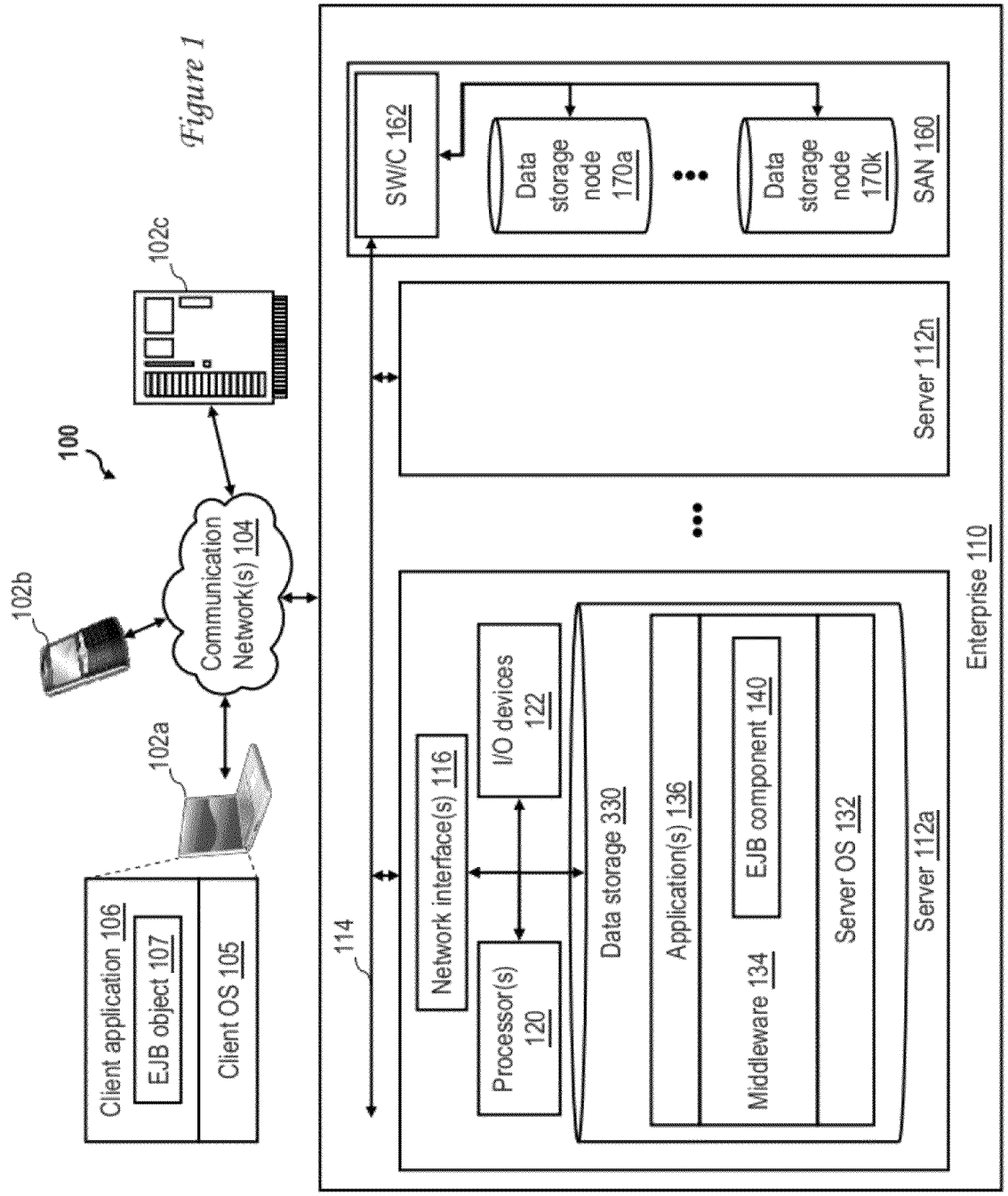
FIG. 1 is an exemplary data processing environment in accordance with one embodiment.

With reference now to the figures and with particular reference to FIG. 1, there is illustrated a high level block diagram of an exemplary data processing environment 100 in accordance with one embodiment. As shown, exemplary data processing environment 100 includes a data processing enterprise 110, which can be operated by or on behalf of an organization, such as a business, governmental agency, non-profit association, educational institution or the like. Data processing enterprise 110 is coupled for communication to one or more circuit-switched or packet-switched communication networks 104, such as wired or wireless local area or wide area network(s), cellular telephony network(s), and/or public switched telephone network(s) (PSTNs). Via communication network(s) 104, data processing enterprise 110 may communicate with a number of client devices 102a-102c (e.g., server computer systems, personal computer systems, portable computer systems, mobile telephones, smart phones).

As indicated, client devices 102a-102c, each of which includes a processor, data storage, and other possibly conventional hardware, executes software including a client operating system 105 and a client application 106, such as a web browser. As shown, client application 106 may include an Enterprise Java Bean (EJB)® object 107, such as a browser plug-in that facilitates communication with data processing enterprise 110, as discussed further below.

The communication between client devices 102a-102c and data processing enterprise 110 can include data communication, for example, via instant messaging, Simple Mail Transport Protocol (SMTP), Hypertext Transfer Protocol (HTTP) and/or other known or future developed protocols. In a typical use scenario, the communication between data processing enterprise 110 and client devices 102a-102c includes the transmission of requests from client devices 102a-102c to data processing enterprise 110 and the transmission of responsive data (e.g., in the form of program objects, markup language (e.g., HTML or XML) pages, images, graphics, text, audio, video, and/or files containing such data) from data processing enterprise 110 to client devices 102a-102c.

Still referring to FIG. 1, data processing enterprise 110 can include one or more physical computer systems, such as servers 112a-112n, which are coupled for communication by a communication fabric 114, that can include, for example, cabling and/or network connections, such as an intranet, virtual private network (VPN) or socket connections. In the illustrated exemplary embodiment, server 112a includes one or more network interfaces 116 that permit server 112a to communicate via communication networks 104 and communication fabric 114. Server 112a additionally includes one or more processors 120 that process data and program code, for example, to service requests of client devices 102a-102c. Server 112a also includes input/output (I/O) devices 122, such as ports, displays, and attached devices, etc., which receive inputs and provide outputs of the processing performed by server 112a. Finally, server 112a includes data storage 330, which may include one or more volatile or non-volatile storage devices, including memories, solid state drives, optical or magnetic disk drives, tape drives, etc.

In the depicted embodiment, data storage 330 stores program code executable by processor(s) 120. The program code includes a server operating system (OS) 132 that manages the hardware resources of server 112a and provides common services to other software executing on server 112a. Server OS 132 may be implemented, for example, with one of the AIX®, Linux®, Android®, or Windows® operating systems. Data storage 330 also stores middleware 134, such as the IBM WebSphere® Application Server (WAS) available from IBM Corporation of Armonk, N.Y. Middleware 134 provides a platform for the development, delivery and communication of distributed applications 136. In a preferred embodiment, middleware 134 is compliant with the Java® Platform, Enterprise Edition (JEE) Specification Edition 6, incorporated herein by reference, and serves as a Java® EE container providing services such as transaction management, persistence, security, connection pooling, and naming services. Middleware 134 preferably contains at least one EJB component 140, which exposes services that clients can invoke. The invocation of a service will result in data exchange between the client and the server. The communication mechanism used to exchange the data relies on a serialization engine, which is part of the Java® runtime shipped as a component of the middleware 134.

In most embodiments, middleware 134 includes program code (e.g., an HTTP server) to support communication of server 112a with other servers 112 and devices client 102a-102c via communication fabric 114 and communication network(s) 104. Should appropriate communication capabilities not be integrated within middleware 134, data storage 330 may additionally include communication code integrated within server OS 132 or implemented as an application 136 that enables server 112a to communicate with other servers 112 and client devices 102a-102c via communication fabric 114 and communication network(s) 104.

It should be appreciated that the contents of data storage 330 can be localized on server 112a in some embodiments and will be distributed across the data storage 330 of multiple of servers 112a-112n in other embodiments. In addition, the contents depicted in data storage 330 of server 112a (and other associated databases) may optionally partially or fully reside on a storage area network (SAN) 160 of data processing enterprise 110. As shown, SAN 160 includes a switch/controller (SW/C) 162 that receives and services storage requests and multiple data storage nodes 170a-170k, each of which may comprise one or more physical non-volatile memory drives, hard disk drives, optical storage drives, tape drives, etc.

It will be appreciated upon review of the foregoing description that the form in which data processing enterprise 110 is realized can vary between embodiments. All such implementations, which may include, for example, one or more handheld, notebook, desktop, or server computer systems, are contemplated as embodiments of the inventions set forth in the appended claims.

As discussed above, in data processing environments such as that depicted in FIG. 1, objects are passed between distributed code, such as EJB component 140 and EJB object 107, in serialized format. In the conventional serialization process discussed above, the stream-based caching that is employed has no mechanism for determining whether or not a mutable object has changed. Consequently, a full serialization process is carried out each time a mutable object is passed between distributed code elements even if the mutable object remains unchanged since it was last communicated between the distributed code elements.

Figure 2:
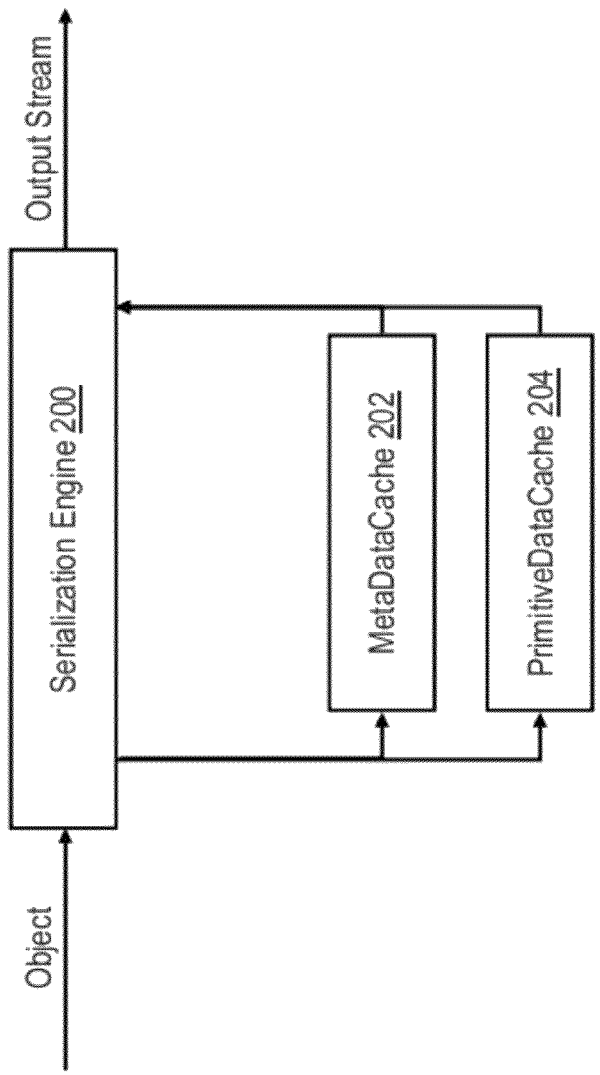
FIG. 2 depicts a serialization engine that serializes mutable objects by reference to a MetaDataCache and a PrimitiveDataCache in accordance with one embodiment.

FIG. 2 depicts an improved serialization data flow applicable to mutable objects in accordance with one embodiment. As depicted, a Java® EE container, such as middleware 134, is shipped with a Java® Runtime Environment which includes a serialization engine 200 that serializes objects into a binary output stream. Serialization engine 200 employs two parallel caches or hash maps across streams to store serialized (binary) data of objects at finer granularity. In particular, a first hash map, MetaDataCache 202, stores a description of each serialized object's class, and a second hash map, PrimitiveDataCache 204, stores the object graph of each serialized object in binary format.

Figure 3:
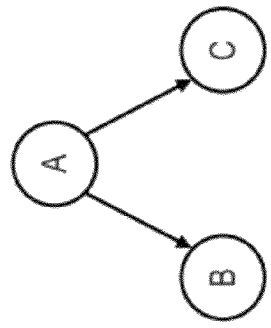
FIG. 3 is an exemplary object graph.

In one preferred embodiment, serialization engine 200 traverses through the object graph of an object to be serialized and stores each object's serialized primitive data as a separate entry. For example, assuming that an object A to be serialized has a reference to object B and C as shown in FIG. 3, then the associated entries of PrimitiveDataCache 204 will be constructed as shown in Table I below.

TABLE I

| Key | Value (byte array) |
| --- | --- |
| A | Primitive data of object A |
| B | Primitive data of object B |
| C | Primitive data of object C |

Consider now the following Java® program, which serializes an object "st" of type "SerialTest" which is derived from "Parent" class and has a container object "con" as one of its fields:

```
class Parent implements Serializable {
    int parentVersion = 10;
}
class Contain implements Serializable{
    int containVersion = 11;
}
public class SerialTest extends Parent implements Serializable {
    int version = 66;
    Contain con = new Contain( );
    public int getVersion( ) {
        return version;
    }
```

```
    public static void main(String args[ ]) throws IOException {
        FileOutputStream fos = new FileOutputStream("temp.out");
        ObjectOutputStream oos = new ObjectOutputStream(fos);
        SerialTest st = new SerialTest( );
        oos.writeObject(st);
        oos.flush( );
        oos.close( );
    }
}
```

Figure 4:
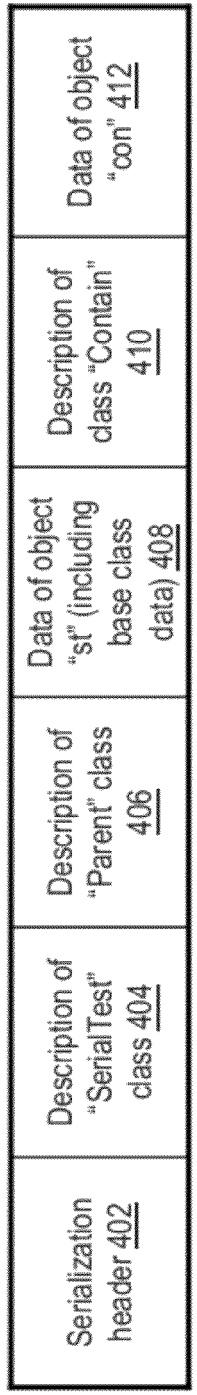
FIG. 4 illustrates an exemplary binary output stream in accordance with one embodiment.

Referring now to FIG. 4, there is depicted a format of the object "st" as serialized by serialization engine 200. As shown, binary output stream 400 includes a serialization header 402, followed by a description of the "SerialTest" class 404 and a description of "Parent" class 406. Following description of "Parent" class 406, binary output stream 400 includes the data of object "st" 408, including its base class data. Finally, binary output stream 400 includes a description of class "Contain" 410 and the data of its instance "con" 412. While serialization engine 200 generates binary output stream 400, serialization engine 200 also builds up the contents of MetaDataCache 202 and PrimitiveDataCache 204 as shown below in Tables II and III, respectively.

TABLE II

| Key | Value (byte array) |
| --- | --- |
| SerialTest.class | Description of class SerialTest |
| parent.class | Description of class "Parent" |
| contain.class | Description of class "Contain" |

TABLE III

| Key | Value (byte array) |
| --- | --- |
| st (SerialTest object) | Data of object "st" |
| con (Contain object) | Data of object "con" |

By constructing MetaDataCache 202 and PrimitiveData-Cache 204 during the initial serialization of the "st" object, serialization engine 200 eliminates the costliest reflection operations involved in retrieving primitive data as part of serialization process from subsequent serialization operations. Thus, when the same object "st" is again requested for serialization, serialization engine 200 traverses through the caches and constructs the serialized format of the object without actually reading the object through reflection. Consequently, the time required to perform the serialization operation is reduced by the time required to retrieve primitive data through reflection.

Moreover, by building a primitive data cache at a finer object level than employed in the prior art, when any one of the objects in the earlier serialized object graph is requested for serialization, serialization engine 200 can retrieve the data from caches 202 and 204 instead of serializing the object again. For example, if the "con" object of the "Contain" class is requested for serialization (alone or as referenced through some other object) for the first time, serialization engine 200 doesn't need to carry out the serialization process because the serialized format of "con" is already present in the cache.

Of course, information for a mutable object can only be utilized in the serialization process if the mutable object has not changed since it was cached. In order to differentiate mutable objects that have changed since being cached from those that have not, mutable objects preferably contain a serialization change (SC) field (e.g., a single bit) that indicates whether or not the mutable object has been modified after it has been serialized by the serialization process.

Figure 5:
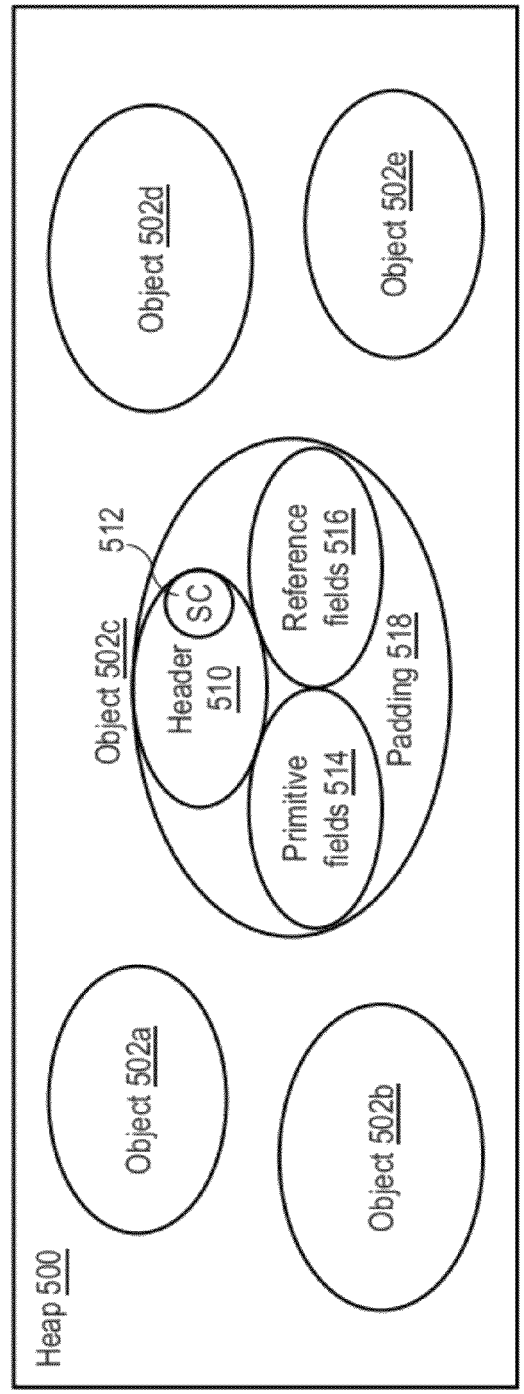
FIG. 5 depicts an exemplary in-memory heap containing a plurality of objects in accordance with one embodiment.

With reference now to FIG. 5, there is illustrated a block diagram of an in-memory heap 500, which is one of the runtime data areas established by a Java® Virtual Machine (JVM®) executing within a Java® Runtime Environment (JRE). As indicated, a number of objects 502a-502e are instantiated within heap 500 from the Java classes defined for a given web application 136 hosted by middleware 134 in FIG. 1. As depicted with reference to exemplary object 502c, objects 502a-502e include an object header 510 providing metadata regarding the object, primitive fields 514, reference fields 516, and optionally one or more unused bytes of padding 518 following the object data to ensure every object starts at a memory address that is a convenient multiple of a selected byte granularity (e.g., 8 bytes).

In accordance with one embodiment, object header 510 includes an SC field 512 (optionally implemented in a conventionally unused header field to avoid increasing object size) indicating whether or not the object has been modified after it has been serialized by the serialization process. For example, in one implementation, SC field is reset to a bit value of 0b0 to indicate the object has not changed since the last serialization and is set to a bit value of 0b1 to indicate that the object has changed since the last serialization.

Figure 6:
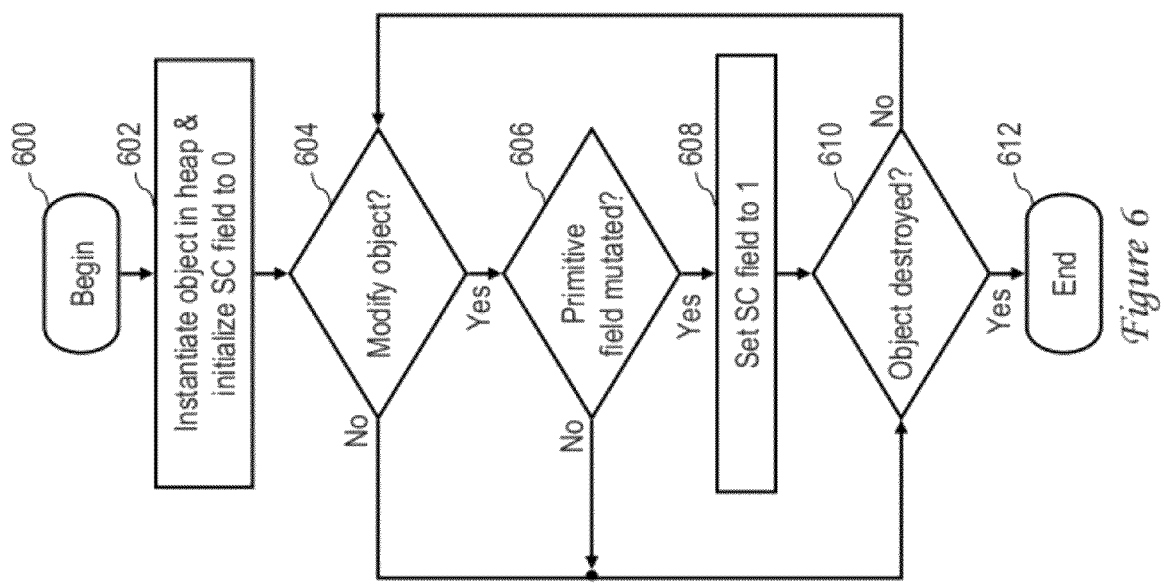
FIG. 6 is a high level logical flowchart of an exemplary process for updating a serialization change (SC) field of an object in accordance with one embodiment.

Referring now to FIG. 6, there is illustrated a high level logical flowchart of an exemplary method of indicating the mutation of a mutable object in accordance with one embodiment. As with the other logical flowcharts illustrated herein, steps are presented in a logical rather than strictly chronological order.

The process begins at block 600 and then proceeds to block 602, which illustrates the JVM® of a Java® application instantiating a mutable object (e.g., object 502c) in heap 500. As indicated at block 604, if the mutable object is modified, the process passes to block 606 and otherwise passes to block 610, which is described below.

As depicted at blocks 606-608, write barrier code of the object sets SC field 512 (e.g., to 0b1) if any primitive field of the object is mutated, but does not set SC field 512 if a reference field of the object is mutated. As indicated above, when set, SC field 512 indicates the object has changed since the last serialization and must be reserialized through the conventional serialization process rather than by reference to PrimitiveDataCache 204.

Following block 608, the process proceeds to block 610, which illustrates that the process given in FIG. 6 continues until the object is destroyed, for example, through the garbage collection process. Thereafter, the process ends at block 612.

Figure 7:
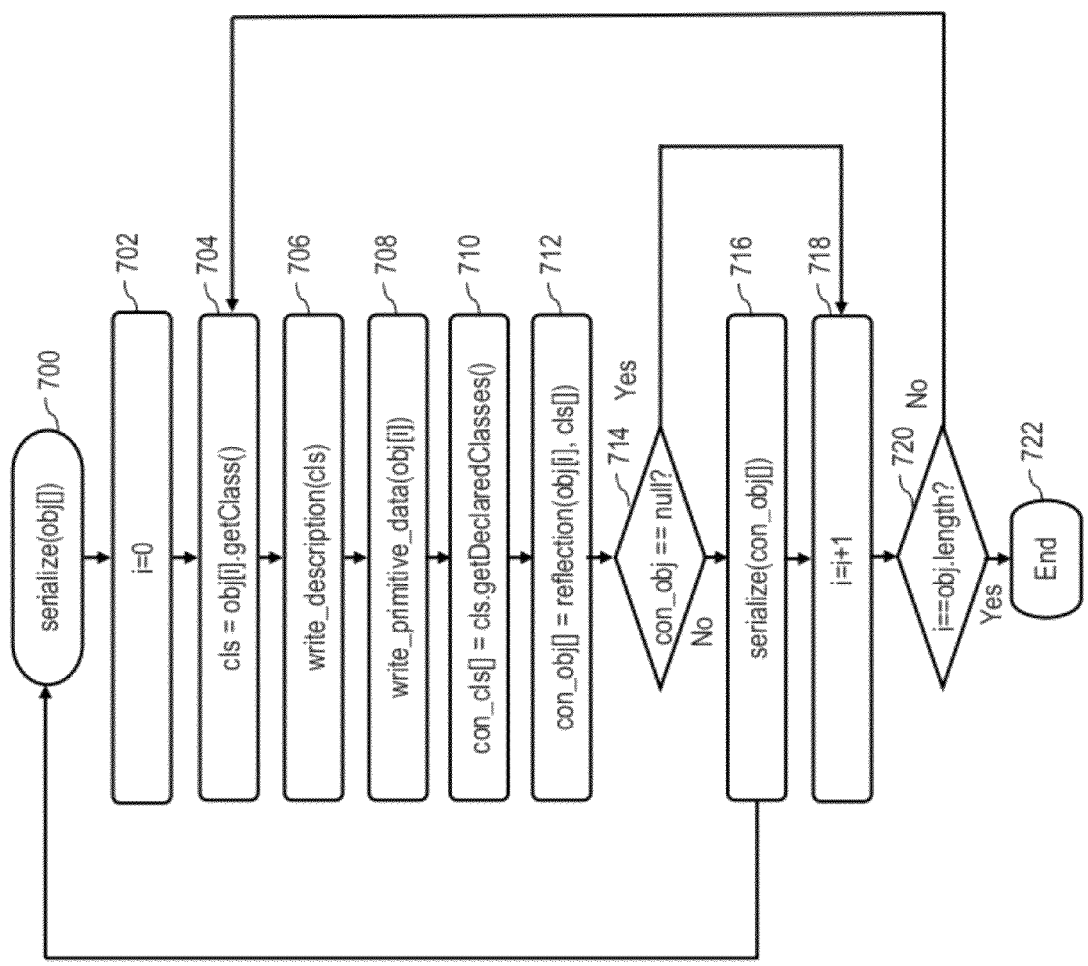
FIG. 7 is a high level logical flowchart of an exemplary process for serializing an object by reference to a MetaDataCache and a PrimitiveDataCache in accordance with one embodiment.

With reference now to FIG. 7, there is illustrated a high level logical flowchart of an exemplary process by which an object is serialized in accordance with one embodiment. In a preferred embodiment, the process depicted in FIG. 7 is performed by serialization engine 200 of FIG. 2. As described below, serialization engine 200 performs a full serialization for only those mutable objects that are not present in the PrimitiveDataCache 204 or have changed since the previous serialization. Other mutable objects are serialized by reference to caches 202 and 204 via an abbreviated reflection operation utilized to obtain all the container object(s) for the object.

The process illustrated in FIG. 7 begins at block 700 in response to invocation of serialization engine 200 to serialize an object "obj". As indicated by block 702 and the program loop spanning to block 720, serialization engine 200 processes object "obj" and each of its container object(s) at a numbers of steps.

First, at block 704, serialization engine 200 gets the class object of object "obj" via the method obj.getClass( ). In addition, serialization engine 200 queries MetaDataCache 202 to get the description of the class returned by the method obj.getClass( ). Serialization engine 200 then writes the definition of the class object and that of any serializable super class of "obj" into the output stream (block 706). The process depicted at block 706 is described further below with reference to FIG. 8. At block 708 of FIG. 7, serialization engine 200 additionally writes the data of object "obj" to the output stream, as described in greater detail with reference to FIG. 9.

Through reflection, serialization engine 200 gets the container object(s) of "obj". In one embodiment, serialization engine 200 identifies the container objects of "obj" by calling the method getDeclaredClasses( ) on this class object and using reflection to get the actual objects, as depicted at block 710-712, respectively. If serialization engine 200 determines at block 714 that there is no container object of the object under consideration, the serialization process proceeds to block 718, which is described below. Otherwise, the process proceeds to block 716, which depicts repetition of previously described blocks 702-714 for the container object.

As depicted in block 718, the serialization process increments the loop variable "i" and proceeds to block 720. At block 720, serialization engine 200 checks whether or not it has completed serializing all the given objects. If serialization engine 200 that at least one object remains to be serialized, the process returns to block 704, which has been described. Otherwise, the process proceeds from block 720 to block 722, which depicts the end of serialization of current object.

Figure 8:
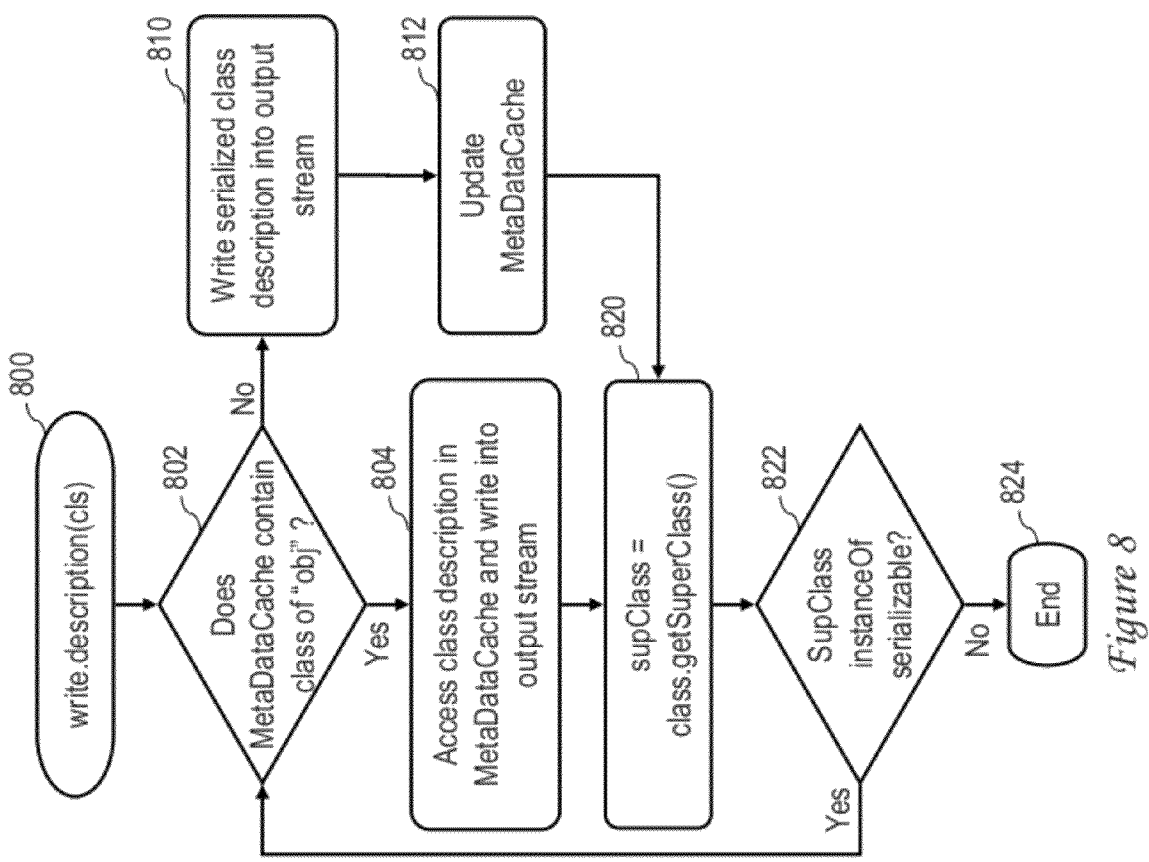
FIG. 8 is a more detailed logical flowchart of an exemplary process for writing a class description into a serialized output stream as shown in FIG. 7.

Referring now to FIG. 8, there is depicted a more detailed logical flowchart of an exemplary process for writing a class description into a serialized output stream as shown at block 706 of FIG. 7. The process of FIG. 8 begins at block 800 and then proceeds to block 802, which depicts serialization engine 200 determining whether or not MetaDataCache 202 contains the description of the class of "obj" returned by the method obj.getClass( ). If so, the process passes to block 804, which is described below. If, however, serialization engine 200 determines that MetaDataCache 202 does not contain a class description for the class of "obj", then serialization engine 200 serializes and writes into the output stream the class description of the class of "obj" (block 810). In addition, at block 812, serialization engine 200 updates MetaDataCache 202 within the serialized description of the class of "obj." The process then passes to block 820, which is described below.

Referring now to block 804, in response to serialization engine 200 determining that MetaDataCache 202 contains the serialized description of the class of "obj", serialization engine 200 accesses the class description in MetaDataCache 202 and writes it directly to the output stream. At indicated at block 820-822, serialization engine 200 recursively writes a serialized description of each super class object of the class of "obj", if any, until a top level serializable class is reached. In one preferred embodiment, serialization engine 200 determines the super class, if any, of a class by calling the class-.getSuperclass( )method. Once the class of "obj" and any serializable super class have been processed, serialization engine 200 terminates the process depicted in FIG. 8 at block 824.

Figure 9:
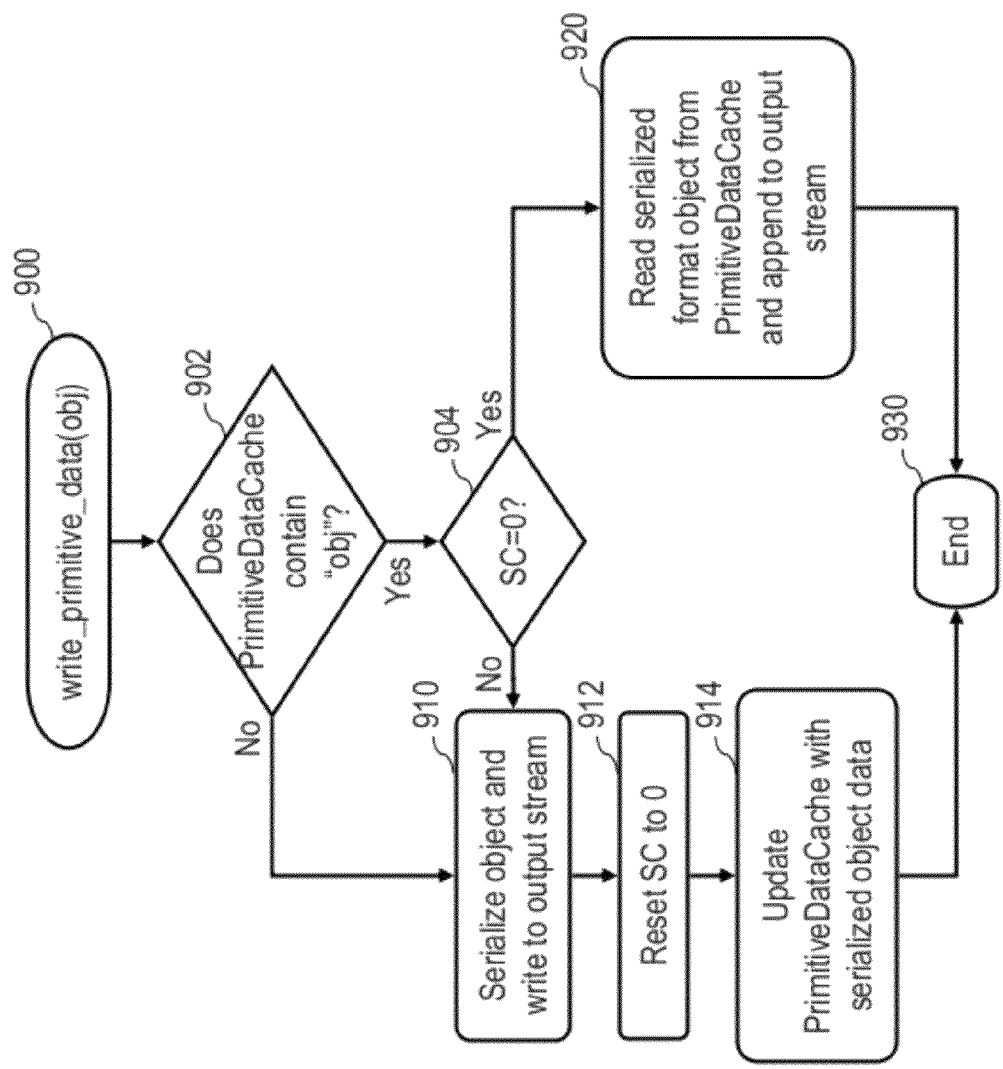
FIG. 9 is a more detailed logical flowchart of a process for writing an object data into a serialized output stream as shown in FIG. 7.

With reference now to FIG. 9, there is illustrated a more detailed logical flowchart of a process for writing a object data into a serialized output stream as shown at block 708 of FIG. 7. The process shown in FIG. 9 begins at block 900 and then proceeds to block 902, which depicts serialization engine 200 determining whether or not PrimitiveDataCache 204 contains the serialized data of the object "obj". If not, the process passes to block 910, which is described below. If, however, serialization engine 200 determines that Primitive-DataCache 204 contains the serialized data of the object "obj", the process proceeds to block 904.

Block 904 illustrates serialization engine 200 determining whether or not SC field 512 of the object "obj" is reset (e.g., to 0b0) to indicate that "obj" has not been modified since its was last serialized. If not (i.e., SC field 512 of "obj" is set to 0b1), the process passes to block 910, which is described below. If, however, serialization engine 200 determines at block 904 that SC field 512 is reset, serialization engine 200 reads the serially formatted data of the object "obj" from PrimitiveDataCache 204 and appends it to the output stream (block 920). Thereafter, the process shown in FIG. 9 ends at block 930.

Returning now to block 910, if an up-to-date serialization of the object "obj" is not present in PrimitiveDataCache 204, serialization engine 200 retrieves and serializes the data of object "obj" and writes it into the output stream. In addition, serialization engine 200 resets SC field 512 of "obj" (e.g., to 0b0) and updates PrimitiveDataCache 204 with the serialized data of object "obj (blocks 912 and 914). The process depicted in FIG. 9 thereafter ends at block 930.

As has been described, in at least some embodiments, a mutable object is serialized utilizing a full serialization process, and primitive data and metadata regarding the mutable object are cached in binary format. Thereafter, the mutable object is again serialized utilizing an abbreviated serialization process by reference to the cached primitive data and metadata, and the serialized mutable object is communicated to a distributed code element. In a preferred embodiment, the mutable object has a object header including a field indicating whether or not the mutable object has changed since last serialized, and the abbreviated serialization process is employed in response to the field indicating that the mutable object has not changed since last serialized. In a preferred embodiment, object primitive and metadata is cached at the most granular level, which ensures that, if a mutable object's primitive data is changed, the cached data pertaining to other mutable objects in its object graph are unaffected.

While the present invention has been particularly shown as described with reference to one or more preferred embodiments, it will be understood by those skilled in the art that various changes in form and detail may be made therein without departing from the spirit and scope of the invention. For example, although aspects have been described with respect to a computer system executing program code that directs the functions of the present invention, it should be understood that present invention may alternatively be implemented as a program product including a tangible, non-transient data storage medium (e.g., an optical or magnetic disk or memory) storing program code that can be processed by a data processing system to perform the functions of the present invention. Further, although preferred embodiments are described herein with reference to serialized objects created in, and used by, Java® software products, the disclosed techniques may be adapted for use with other programming languages; thus, references to Java® serialization are by way of illustration and not of limitation.

What is claimed is:

1. A method of serializing a program object in a data processing system, the method comprising:

utilizing a full serialization process, a serialization engine serializing a mutable object into binary format, wherein the mutable object includes (1) primitive data of one or more primitive fields of the mutable object, (2) metadata describing one or more classes referenced by the mutable object, and (3) a serialization change field indicating whether or not the primitive data of the mutable object has changed since last serialized;

the serialization engine caching, in the binary format, serialized primitive data and serialized metadata regarding the mutable object obtained from the full serialization process, wherein the caching includes the serialization engine caching the serialized metadata in a metadata cache and the serialization engine caching the serialized primitive data in a primitive data cache separate from the metadata cache;

thereafter:
the serialization engine again serializing the mutable object, wherein again serializing the mutable object includes:
only in response to the serialization engine field indicating that the primitive data of the mutable object has not changed since last serialized, the serialization engine again serializing the mutable object utilizing an abbreviated serialization process by reference to the cached serialized primitive data and the cached serialized metadata, wherein again serializing the mutable object utilizing the abbreviated serialization process includes the serialization engine accessing the cached serialized primitive data and the cached serialized metadata of the mutable object and writing the cached serialized primitive data and the cached serialized metadata of the mutable object in the binary format directly into an output stream;
in response to the serialization change field indicating that the primitive data of the mutable object has changed since last serialized, the serialization engine again serializing the mutable object utilizing the full serialization process; and
communicating the mutable object as again serialized to a distributed code element.

2. The method of claim 1, wherein:
the mutable object includes an object header containing the serialization change field;
the method further comprising setting the serialization change field to indicate the mutable object has changed since last serialized in response to modifying the primitive data of at least one of the one or more primitive fields of the mutable object.

3. The method of claim 1, wherein:
the mutable object comprises a first object;
the first object is referenced in an object graph of a second object; and
the serialization engine serializing the mutable object utilizing the full serialization process includes serializing the first object in response to serialization of the second object.

4. The method of claim 1, wherein the serialization engine again serializing the mutable object utilizing an abbreviated serialization process comprises:
obtaining a container object for the mutable object by reflection.

5. The method of claim 3, wherein:
the serialization engine again serializing the mutable object utilizing the abbreviated serialization process includes again serializing the first object utilizing the abbreviated serialization process in response to serialization of a third object that references the first object.

6. The method of claim 1, wherein the serialization engine caching the serialized primitive data and the serialized metadata regarding the mutable object obtained from the full serialization process further includes the serialization engine caching, in binary format, the serialized primitive data and the serialized metadata regarding each object referenced by the mutable object.

7. The method of claim 6, wherein the caching includes:
the serialization engine caching the serialized primitive data in a respective primitive data cache entry per object; and
the serialization engine caching the serialized metadata in a respective metadata cache entry per object.

* * * * *